United States Patent
Kloess et al.

(10) Patent No.: US 9,969,426 B2
(45) Date of Patent: May 15, 2018

(54) SYSTEMS AND METHODS FOR VARIABLE STEERING ASSIST-II

(71) Applicant: GM GLOBAL TECHNOLOGY OPERATIONS LLC, Detroit, MI (US)

(72) Inventors: Scott R Kloess, Rochester Hills, MI (US); Michael C Gaunt, Metamora, MI (US); Terrel D Johnson, West Bloomfield, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days. days.

(21) Appl. No.: 15/170,247

(22) Filed: Jun. 1, 2016

(65) Prior Publication Data
US 2017/0349209 A1    Dec. 7, 2017

(51) Int. Cl.
*B62D 6/02* (2006.01)
*B62D 5/04* (2006.01)
*B62D 6/00* (2006.01)

(52) U.S. Cl.
CPC ............ *B62D 6/02* (2013.01); *B62D 5/046* (2013.01); *B62D 6/00* (2013.01)

(58) Field of Classification Search
CPC ............ B62D 6/02; B62D 5/046; B62D 6/00
See application file for complete search history.

(56) References Cited

U.S. PATENT DOCUMENTS

| | | | |
|---|---|---|---|
| 6,588,770 B1 | 7/2003 | Lee | |
| 8,155,836 B2 | 4/2012 | Christiansen et al. | |
| 8,504,246 B2 | 8/2013 | Christiansen et al. | |
| 9,085,317 B2 | 7/2015 | Johnson et al. | |
| 2005/0280219 A1* | 12/2005 | Brown | B60G 3/06 280/5.5 |
| 2015/0034407 A1* | 2/2015 | Guerster | B62D 6/002 180/282 |

* cited by examiner

*Primary Examiner* — Yuen H Wong

(57) ABSTRACT

Methods and apparatus are provided for controlling a steering assist unit of a vehicle. The method includes receiving first accelerometer data, second accelerometer data, and third accelerometer data then comparing and calculating differences between the first accelerometer data, second accelerometer data and the third accelerometer data to determine a relative movement values for the second and third locations. The relative movement value represents the contraction or expansion of separate systems as they independently move at or near the second and third locations. The method further includes outputting a control signal to control the travel of the steering assist unit based on the relative movement values.

6 Claims, 4 Drawing Sheets

SYSTEMS AND METHODS FOR VARIABLE STEERING ASSIST-II

TECHNICAL FIELD

The present disclosure generally relates to steering systems for vehicles and more particularly relates to systems and methods for variable steering assist in a motor vehicle.

BACKGROUND

Steering systems generally assist the operator of the vehicle in maneuvering the vehicle during use. Generally, steering systems have a steering assist unit, such as a rack and pinion mechanism, which can have a fixed range of travel. In certain driving conditions, however, it may be desirable to have a greater range of travel for the steering system, such as when parking the vehicle. However, having a greater range of travel may be undesirable when the vehicle is traveling over uneven surfaces given that different components of the vehicle may interfere with each other.

Accordingly, it is desirable to provide systems and methods for variable steering assist during the operation of the vehicle. Furthermore, other desirable features and characteristics of the present invention will become apparent from the subsequent detailed description and the appended claims, taken in conjunction with the accompanying drawings and the foregoing technical field and background.

SUMMARY

A method is provided for controlling a steering assist unit of a vehicle. The method includes receiving first accelerometer data, second accelerometer data, and third accelerometer data then comparing and calculating the first accelerometer data, second accelerometer data and the third accelerometer data to determine relative movement between the three independently moving components. The method further includes outputting a control signal to control the travel of the steering assist unit based on the relative movement. The output of the aforementioned control signal is then implemented by the steering assist unit to either limit the steering travel or to provide a return force that unsteers the steering system to the travel limit value.

An apparatus is provided for a steering assist unit control system for a vehicle. The apparatus includes a steering assist unit having a path of travel, and a steering assist control module. The steering assist control module determines a travel limit value for the steering assist unit based on a comparison of and/or calculation of the first accelerometer data, second accelerometer data, and third accelerometer data.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1A:
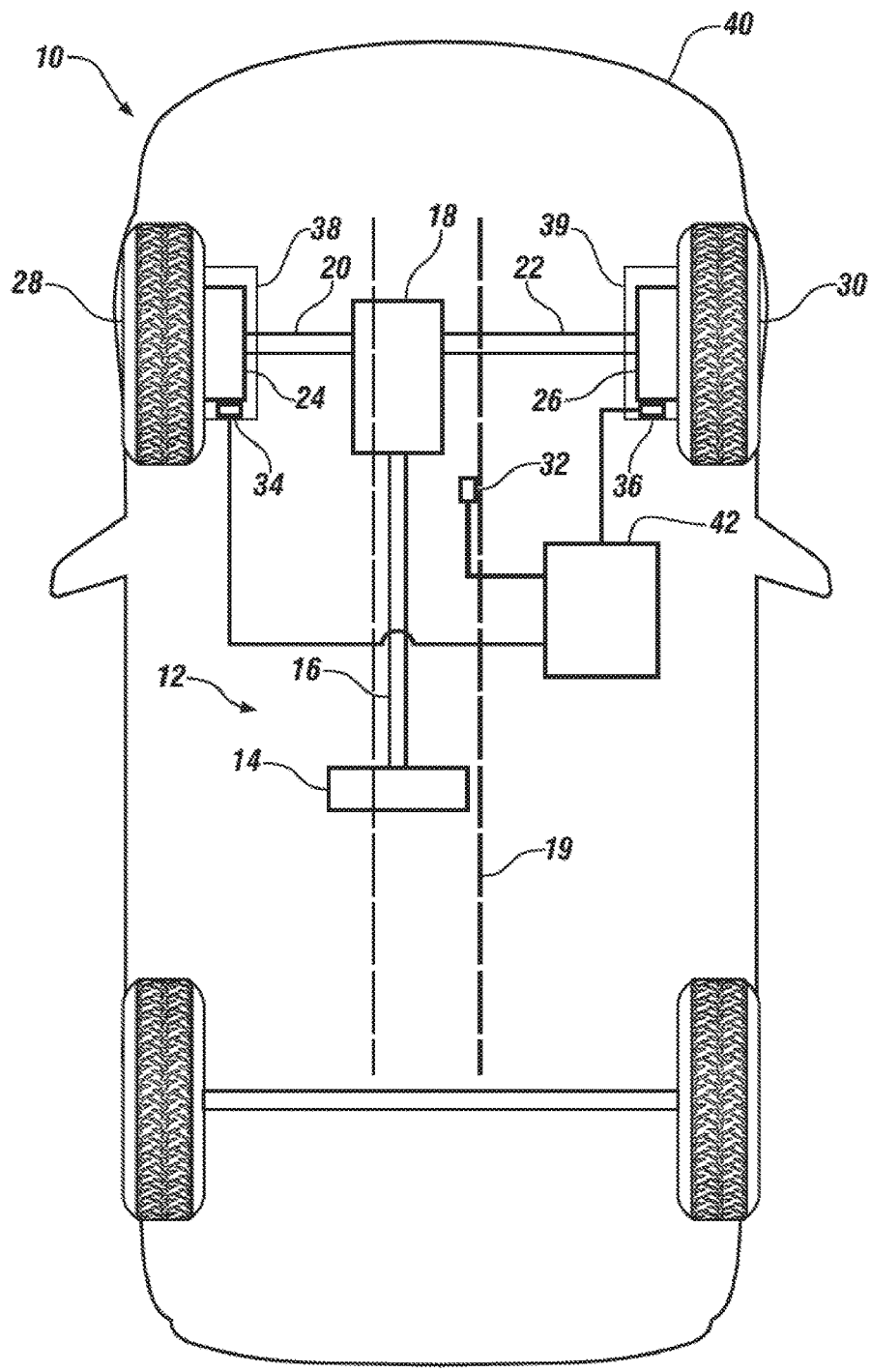
FIG. 1A is a schematic diagram illustrating a first embodiment of a steer assist control system of the present disclosure.
Figure 1B:
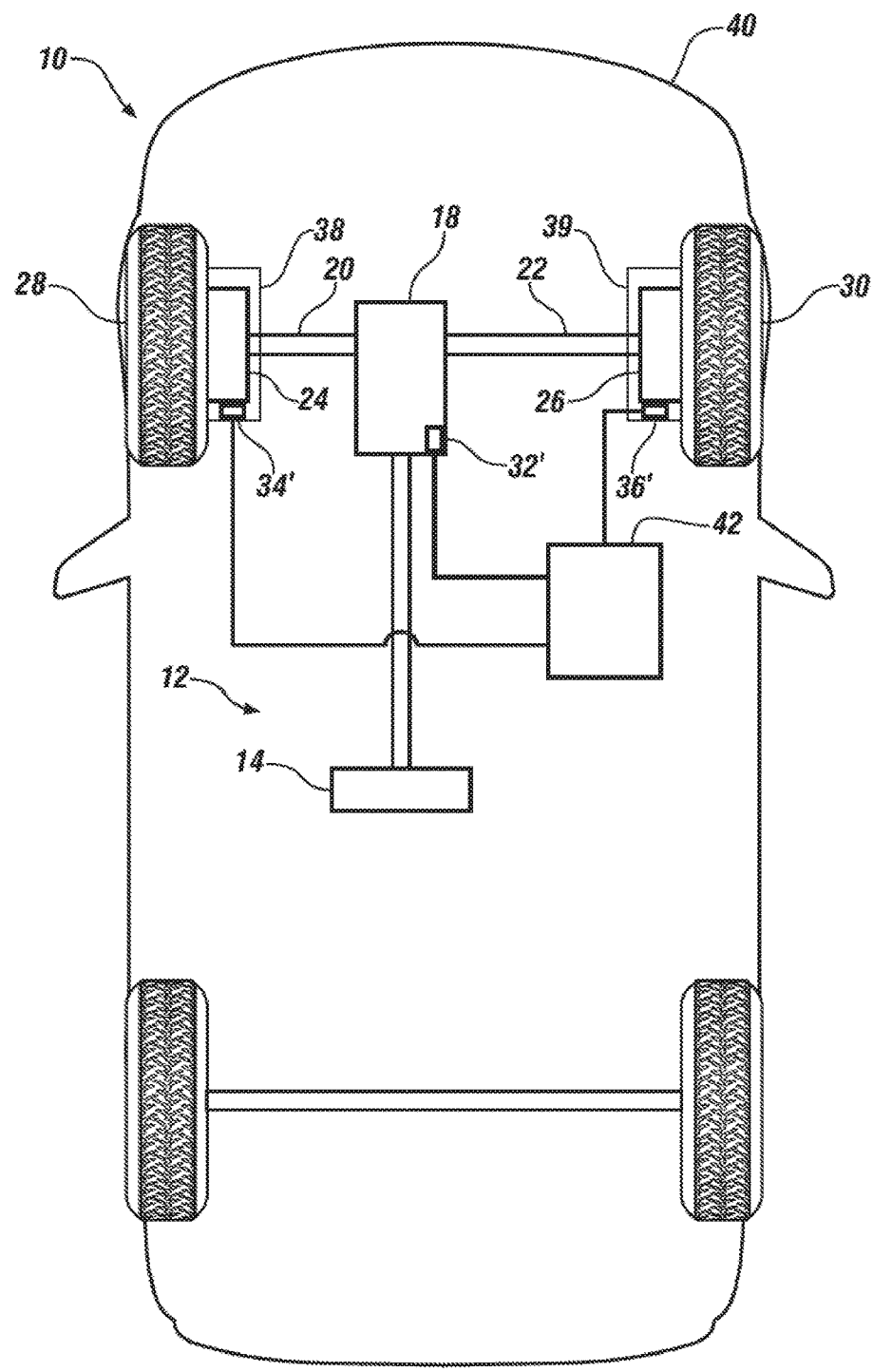
FIG. 1B is a schematic diagram illustrating a second embodiment of a steer assist control system of the present disclosure.
Figure 1C:
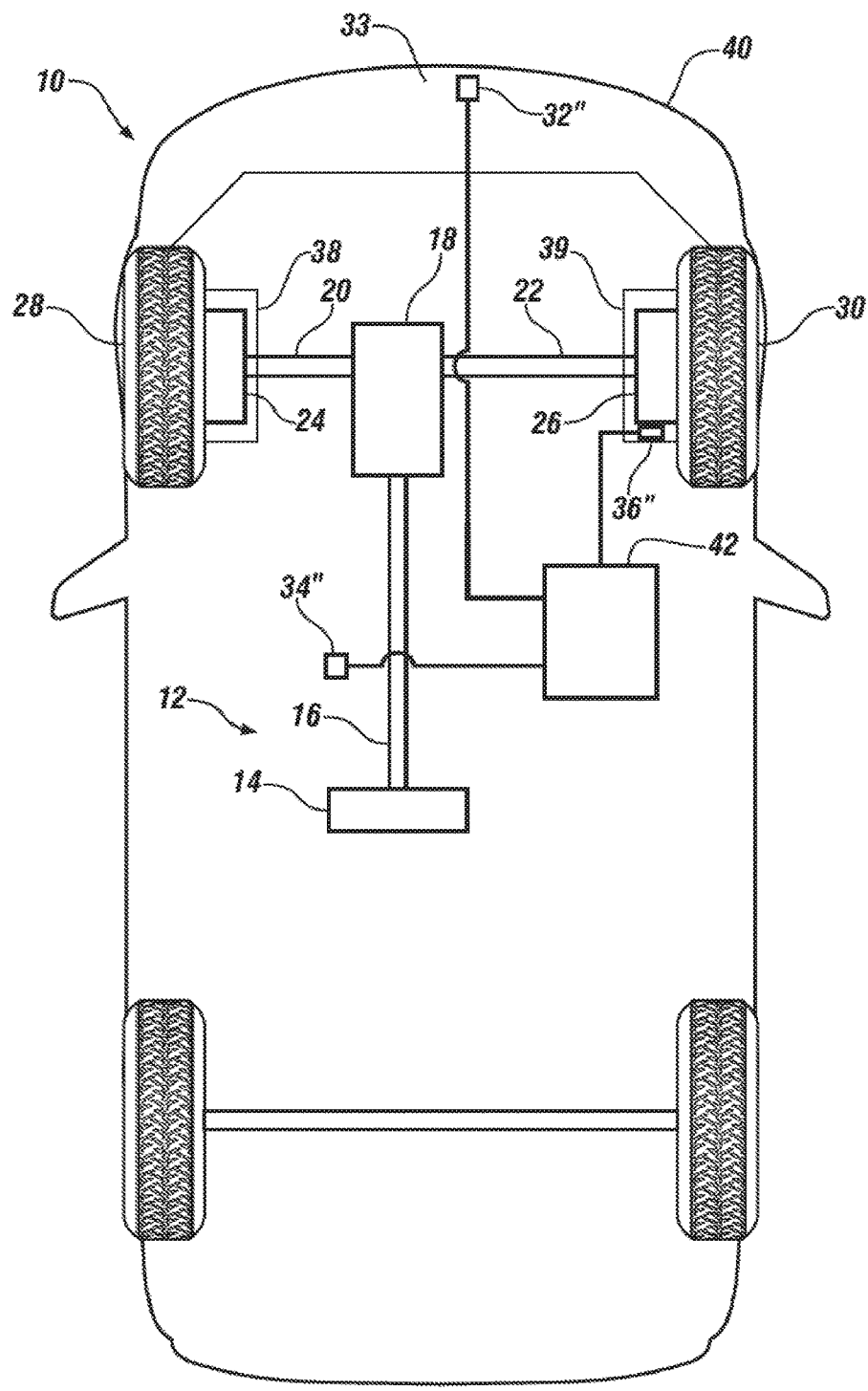
FIG. 1C is a schematic diagram illustrating a third embodiment of a steer assist control system of the present disclosure.

With reference to FIGS. 1A-1C, a vehicle 10 is shown having a steering system 12 in accordance with various embodiments. Although the figures shown herein depict an example with certain arrangements of elements, additional intervening elements, devices, features, or components may be present in an actual embodiment. It should also be understood that FIGS. 1A-1C are merely illustrative and may not be drawn to scale.

In various embodiments, the steering system 12 includes a hand wheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing (hereinafter referred to as the steering actuator). During operation, as the hand wheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10. Although an EPS system is illustrated in FIGS. 1A-1C and described herein, it is appreciated that the steering system 12 of the present disclosure can include various controlled steering systems including, but not limited to, steering systems with hydraulic configurations, front EPS systems, active rear steering systems, and steer by wire configurations—where any of the aforementioned systems may, but not necessarily, be steering the wheels independently.

As part of the various vehicle systems, such as but not limited to, the vehicle body system, suspension control system or the vehicle safety system, FIG. 1A illustrates the first, second, and third accelerometers 32, 34, 36 positioned in a vehicle body 10 wherein such accelerometers 32, 34, 36 may serve the additional function of obtaining data to determine "relative movement value(s)" which reflects the relative movement of the independently moving body 40 (or frame) relative to each of the front independently moving wheels 28, 30. In order to provide optimum steering maneuverability and vehicle handling, present disclosure provides a vehicle system which contemplates the various external forces that cause independent movement in each of the body 40 and each of the wheels 28, 30. The "relative movement value" between the body 40 (or frame) versus the first and second front wheels 28, 30 may be measured by obtaining data from first, second, and third accelerometers 32, 34, 36 to determine whether various vehicle systems or components are contracting ("jounce condition") under external loads thereby risking a condition of unwanted part interference. Moreover, the data obtained from the first, second and third accelerometers 32, 34, 36 may determine whether rebound is occurring between the body 40 (or frame) and the wheels 28, 30. A rebound condition exists in FIG. 1A where a portion of the body 40 (or frame) and any one of an identified wheel 28, 30 may each be moving away from each other. The relevance of determining rebound will be further explained in greater detail herein.

In a first embodiment, the present disclosure provides for a method where a steering assist unit receives data from at least three accelerometers—first, second, and third accelerometers 32, 34, 36. The first accelerometer data (shown as 32A in FIG. 2A) comes from a first accelerometer 32 at a first location (shown as drive tunnel 19 in FIG. 1A), second accelerometer data (shown as 34A in FIG. 2A) from a second accelerometer 34 at a second location (shown as first front steering knuckle 24, and third accelerometer data (shown as 36A in FIG. 2A) from a third accelerometer 36 at a third location (shown as second front steering knuckle 26). The first accelerometer 32 may be affixed to the vehicle body 40 (such as, but not limited to the floor pan or drive tunnel 29) or the vehicle frame. The first accelerometer 32 may also be referenced as the central vehicle accelerometer. It is understood that the first accelerometer 32 or central vehicle accelerometer may be affixed to any portion of the vehicle body 40 or frame. The first accelerometer or central vehicle accelerometer may be a two axes or a three axes accelerometer which may measure linear acceleration or angular acceleration. The first accelerometer 32 can detect movement/acceleration of the body at each wheel location. With respect accelerometers associated with the wheels, it is understood that such accelerometers 34, 36, 37, 41 may be affixed to any one of the corresponding wheel, a suspension portion or knuckle for the associated wheel location.

The data 34A, 36A (shown in FIG. 2A) from the second and third accelerometers 34, 36 may identify the linear accelerations for each of the front wheels 28, 30 respectively as shown in FIG. 1A. The linear acceleration may be measured along the front wheel's path of motion. The control unit 42 may then compare the data (shown as 32A in FIG. 2A) from the first accelerometer 32 (or central vehicle accelerometer) against the second accelerometer data 34B (which may be located at or near a first front wheel 28) to identify the movement between moving body 40 (or frame) and the moving first front wheel 28. A control unit 42 determines relative movement value(s) based on the input data. If the relative movement value(s) which results from comparing the first accelerometer data against the second accelerometer data is outside of an acceptable range, then the steering control unit 42 (or the steering travel control module 102) will not allow for the steering rack travel to be extended given that the total movement between the body 40 (or frame) and the first front wheel may result in an undesirable condition. Accordingly, if the relative movement between the two independently moving parts is outside of the acceptable range, one of two results may be implemented. First, if the actual steering travel is less than or equal to the default travel limit value, the system will not allow steering beyond the default travel limit value. Second, if the actual steering travel is greater than the limit value, the system will provide a return force (control signal to the steering assist unit) such that the steering assist unit will unsteer the travel to the default travel limit value.

On one end outside of the acceptable range, the input data 32A, 34A from the first accelerometer data 32 and the second accelerometer 34 may demonstrate that each of the vehicle body 40 and the first front wheel 28 are rapidly moving away from each other thereby identifying an unacceptable rebound condition in that location. On the other end outside of the acceptable range, the input data 32A, 34A from the first accelerometer 32 and the second accelerometer 34 may demonstrate that each of the vehicle body 40 and the first front wheel 28 are both rapidly moving toward each other identifying an unacceptable jounce condition. In the event that relative movement value(s) falls outside of the acceptable range, the control unit 42 will not extend the travel for the steering rack in order to prevent undesirable part interference between the wheel well and the tire. It is understood that the undesirable part interference occurs between the wheel well and the tire/wheel 28, 30 if steering travel is beyond the default travel limit value when the vehicle is in a jounce condition (where the parts have both independently moved toward each other such that there is insufficient spatial margin between them.)

It is further understood when an undesirable rebound condition is present, the associated undesirable jounce condition is going to soon follow. This commonly happens when a tire encounters a slight bump followed by a pothole such that the tire and vehicle body 40 (or frame) are each rapidly moving away from each other where, upon landing, the tire and vehicle body 40 (or frame) are undesirably contracted relative to each other. That is, the vehicle body 40 and the tire for the wheel 28, 30 are each rapidly moving toward each other. The present disclosure provides a system which will prevent additional steering rack travel upon detecting the undesirable, independent and rapid movements of the each of the body 40 (or frame) away from each tire for the identified wheels 28, 30, 37, 41 in order that any tire does not interfere with the wheel well.

As stated, the control unit 42 or the steering travel control module 102 within control unit 42 may then compare and calculate the second and third accelerometer data 34A, 36A against the data 32A from the first accelerometer 32 (or central vehicle accelerometer) to determine a relative movement value(s) by comparing the acceleration of the body 40 (or frame) against the accelerations of each of the front wheels 28, 30. The relative movement value(s) identifies where the body 40 and wheels are each independently moving away from each other, or where the body 40 and wheels are each independently moving towards each other. (Again, the "relative movement value" is understood to mean the expansion or contraction of overall vehicle systems/components as indicated above). When the "relative movement value" falls outside of an acceptable range—indicating excessive rebound or jounce, then the control unit 42 identifies a travel limit value from the travel datastore 104; and then the steering assist unit receives travel limit value 112 from control unit 42 to control the travel of the steering wheel thereby preventing the tires for the wheels 28, 30 from turning too far such that a tire may contact the wheel well. It is further understood that, in the event of a jounce condition, a control signal will be sent to steering assist unit 18 such that the steering assist unit 18 may provide a return force to the steering system if the actual travel of the steering is greater than the travel limit value.

With reference to FIG. 1B, it is further understood that a fourth accelerometer 37 and a fifth accelerometer 41 may added to the aforementioned system such that the fourth and fifth accelerometers 37, 41 are respectively affixed to an areas which are each associated with a first rear wheel 27 and a second rear wheel 25. When the additional fourth and fifth accelerometers 37, 41 are implemented, "relative movement values" are similarly determined by comparing first accelerometer data 32A against the data 37A, 41A from the first rear wheel 37 accelerometer and the second rear wheel accelerometer 41. Such relative movement values are then used to determine as to whether the steering rack travel should be limited or extended.

As indicated, it is understood that fewer or more accelerometers may be implemented in the present disclosure. Accordingly, as shown in FIG. 1C, in yet another embodiment, as many as eight accelerometers may be implemented wherein two accelerometers are implemented near each wheel location where there is a base accelerometer 24, 29, 31, 33 affixed to either the body 40 or frame at each wheel location as shown and a corresponding wheel accelerometer 34, 36, 37, 41 affixed to an area associated with each wheel 25, 27, 28, 30. In this embodiment, the control unit 42 (via steering travel control module 102) formulates a "relative movement value" for the various parts in motion near each wheel 25, 27, 28, 30 based on a comparison of the base accelerometer data from each base accelerometer 24, 29, 31, 33 against each corresponding data received from each corresponding wheel accelerometer 34, 36, 37, 41. As stated, the steering travel control module 102 may then compare and calculate each base accelerometer data (for either the body or frame) against each the wheel accelerometer data to determine a relative movement value for each wheel location. The relative movement value identifies where the body 40 and wheels 25, 27, 28, 30 are independently moving away from each other or where the body 40 and wheels 25, 27, 28, 30 are each independently moving towards each other for the respective location. Again, the "relative movement value" is understood to mean the expansion or contraction of the vehicle systems/components as indicated above). When the "relative movement value" falls outside of an acceptable range—indicating excessive rebound or jounce, then the steering assist unit identifies a travel limit value; and the steering assist unit outputs a control signal to control the travel of the steering wheel to prevent the tires from turning too far such that the tire may contact the wheel well. In addition to imposing a travel limit for the steering system (when the steering system travel is at or below the travel limit value), a control signal may be sent to the steering assist unit such that steering assist unit may provide a return force to the steering system if the actual travel of the steering is greater than the travel limit value.

The central vehicle accelerometer (or first accelerometer 32) may be attached to the vehicle floor pan underneath the front seats as part of the vehicle safety (airbag) system. Alternatively, the central accelerometer (or first accelerometer 32) may also be integrated into the control unit 42 and/or the airbag control unit (not shown). It is also known that the central accelerometer (or first accelerometer 32) may be affixed to the structural members which are aft of the front grill/headlights but below the hood. While it is possible that the central vehicle accelerometer or first accelerometer 32 may have been initially implemented for the vehicle's safety control system, the data from the first or central vehicle accelerometer 32 may be implemented for the steering control unit 42 via the CAN bus.

Accordingly, in the first embodiment, the first location for the first accelerometer 32 may be on any portion of the vehicle body 40 or frame such as the drive tunnel or floor pan of the vehicle body 40 while the second and third locations are respectively at the front wheels (shown as first front wheel 28 and second front wheel 30 in FIG. 1A). Another non-limiting example may be where the first accelerometer 32' may be on the steering assist unit 18 (shown in FIG. 1B) while the second and third locations are also at the front wheels 28. 30 respectively.

In the example embodiments, the first accelerometers 32 shown in FIGS. 1A and 1B may measure the vector G-forces on any portion of the body 40 or frame while a second accelerometer 34 may measure the vector G-forces on a first front wheel 28 and a third accelerometer 36 measures the vector G-forces on a second front wheel 30. These data points coming from the accelerometers 32, 34, 36 may be used by the steering travel control module 102 (See FIG. 2A) to determine whether the relative movement values between the body 40 (or frame) versus each front wheel fall within an acceptable range. As indicated, the steering assist unit may allow for extended steering rack travel when the relative movement values at each front wheel fall within the acceptable range. The extended steering rack travel provides for a decreased turning radius and better maneuverability. However, when the relative movement values fall outside of an acceptable range, the steering travel control module maintains the steering rack travel within the default limit range. In the event that relative movement values between the body 40 (or frame) versus each front wheel fall outside of an acceptable range and the steering rack is already in the extended travel mode, the steering control module 42 sends a signal to the steering assist unit to provide a return force to bring the steering rack travel within the default limit range and so that the tire angles are decreased relative to the wheel well.

As indicated in the non-limiting example, the vehicle may be operating at a velocity below a predetermined threshold (such as but not limited to 15 miles per hour) before the aforementioned control unit 42 algorithm (starting at step 201 shown in FIG. 3) is triggered to operate. The control unit 42 may determine the relative movement value for each front wheel 28, 30 by using accelerometer data from first, second and third accelerometers 32, 34, and 36. It is understood that system and method of the present disclosure may be triggered by a variety of modules which include but are not limited to engine control unit, steering control unit, transmission control unit, brake control unit. Data regarding vehicle speed, propulsion available (engine running), transmission position (Park, Neutral, Drive, Reverse), and steering system state of health may be detected by any one or more of the various modules in order to generate the trigger signal. The commonly used modules to provide these triggers are the Engine Control Unit (vehicle speed, propulsion available), Transmission Control Module (transmission position), Steering Control Unit (vehicle speed, steering state of health), Brake Control Unit (vehicle speed). Vehicle speed is primarily calculated using the individual wheel speed sensors as inputs.

As the differences between vector G-forces at the three different locations increase, the control module decreases the amount of travel that the steering assist unit can move the tie rods 20, 22 in order to prevent unwanted part interference or undesirable drive control. However, as the differences between the vector G-forces at the three different locations decrease, then the control module increases the amount of travel that the steering assist unit can move the tie rods 20, 22 in order to decrease the turning radius of the vehicle. By increasing the amount of travel that the steering assist unit 18 can move the tie rods, the turning radius of the vehicle decreases thereby providing better maneuverability. While many other different combinations of components throughout the vehicle may be used as the first, second and third locations for the accelerometers to determine the relative movement values, the first, second, and third accelerometer data 32A, 34A, 36A provides accurate data to the control unit 42 as to the so that unwanted part interference may be avoided.

Furthermore, one or more of the conditions measured by the first, second and third accelerometers 32, 34, 36 can be derived from other sources, such as by modeling, for example. It should also be noted that the vehicle 10 can include various other accelerometers that detect and measure observable conditions of the steering system 12 and/or of the vehicle 10, including, but not limited to a yaw angle accelerometer and a hand wheel angle accelerometer in order to determine a relative movement value.

In various embodiments, a control unit 42 controls the operation of the steering system 12 and/or the vehicle 10 based on the differences between vector forces exerted on various parts of the vehicle which in turn identify where vehicle contraction may occur resulting in undesirable part interference. Accordingly, the steering control systems and methods of the present disclosure may determine a range of travel for the steering assist unit 18 based on such readings from at least the first, second and third accelerometers.

It should be noted that the control unit 42 is in communication with the first, second and third accelerometers 32, 34, 36 and steering assist unit 18 over a suitable communication architecture, such as a data bus, associated with the vehicle 10.

Figure 2A:
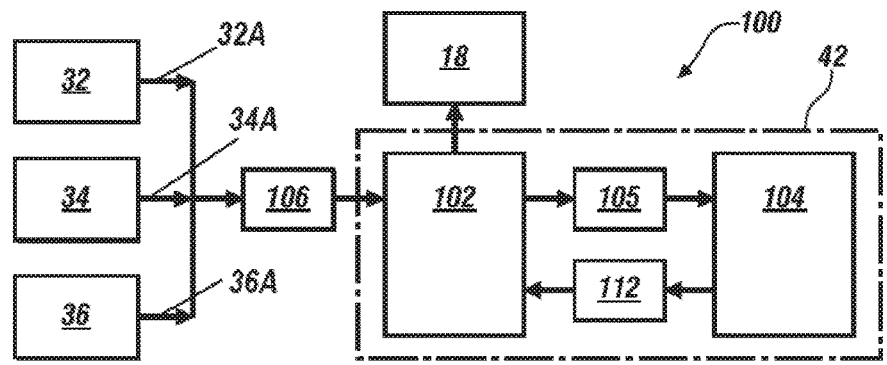
FIG. 2A is a dataflow diagram illustrating a control system of the steering system in accordance with various embodiments.
Figure 2B:
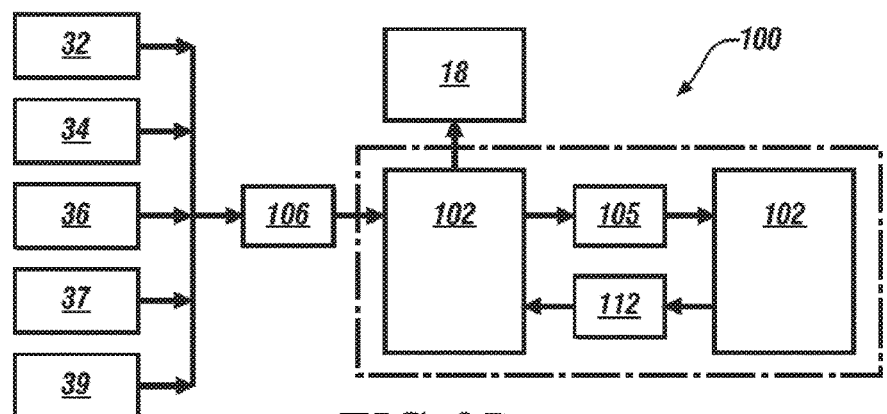
FIG. 2B is yet another dataflow diagram illustrating a control system of the steering system in accordance with various embodiments.

Referring now to FIGS. 2A and 2B, and with continued reference to FIG. 1, dataflow diagrams illustrates various embodiments of a steering control system 100 for the steering system (FIG. 1) that may be embedded within the control unit 42. FIG. 2A contemplates the use of three accelerometers while FIG. 2B contemplates the use of five accelerometers where central vehicle accelerometer data is compared against each accelerometer 34, 36, 37 41 affixed near the wheel locations. Various embodiments of the steering control system according to the present disclosure can include any number of sub-modules embedded within the control unit 42. As can be appreciated, the sub-modules shown in FIGS. 2A-2B can be combined and/or further partitioned to similarly limit the travel of the rack of the steering system 12 (FIG. 1). Inputs to the system can be received from other control modules (not shown), and/or determined/modeled by other sub-modules (not shown) within the control unit 42. In various embodiments, the control unit 42 includes a steering travel control module 102 and a travel datastore 104.

The travel datastore 104 stores one or more tables (e.g., lookup tables) that indicate an acceptable amount of travel of the steering assist unit 18 along a path of travel associated with the steering assist unit 18. In other words, the travel datastore 104 stores one or more tables that provide limits for the movement of the steering assist unit 18. In various embodiments, the tables can be interpolation tables that are defined by one or more indexes. A travel limit value 112 provided by at least one of the tables indicates an amount of travel permitted by the steering assist unit 18. For example, the amount of travel may be an amount of travel of a rack of the steering assist unit 18. The table may be indexed by the relative movement values for the identified wheel locations (having accelerometers). The relative movement value for each wheel location may, but not necessarily, be determined by the difference between the forces exerted on each wheel versus the forces exerted on the body 40 (or frame) at that location. Thus, in order to improve vehicle stability due to the contraction and/or expansion of vehicle subsystems and subcomponents, the travel limit in one non-limiting example may indicate an amount of travel permitted by the steering assist unit 18 based on the relative movement values.

Referring to FIG. 2A, the steering travel control module 102 receives as input vehicle data 106 from first accelerometer 32, second accelerometer 34, and third accelerometer 36. The vehicle input data 106 is comprised of first accelerometer data 32A, second accelerometer data 34A and third accelerometer data 36A. The steering travel control module 102 generates a steering assist control signal 110 to the steering assist unit 18 based on a comparison and calculation of the vehicle input data 106. In one example, the vehicle input data 106 are received and compared by the steering travel control module 102 by determining the difference in the data from the first accelerometer 32, second accelerometer 34 and third accelerometer 36 to determine a relative movement value for each wheel location and to determine if each relative movement value falls within an acceptable range. Then, a travel limit value 112 is determined from the one or more tables of the travel datastore 104 based on the vehicle input data 106 (e.g., by performing a lookup function on the tables to determine a travel limit value using the relative movement value calculated from the first/second/third accelerometer data). The steering assist control signal 110 is then generated to the steering assist unit 18 to control the travel of the steering assist unit 18 such that the steering system stays within the travel limit value identified from the travel datastore 104. With reference to FIG. 2B, the input data is changed in that input data from the rear wheels 25, 27 are also considered in the event there is steering at the rear wheels.

It is understood that the above non-limiting example algorithm may, but not necessarily, be triggered only when the vehicle is below a predetermined threshold or in a particular mode, such as but not limited to certain propulsion availability, transmission position, steering state of health or a vehicle velocity range. One example vehicle velocity range is where the vehicle is operating at a speed which is less than about 15 miles per hour (mph). Therefore, the permitted travel limit for the steering assist unit 18 may be increased beyond the standard setting so long as the relative movement values at each monitored location is within acceptable limits according to the data.

The increased travel of the steering assist unit 18 thereby reduces the turning radius of the vehicle 10, which aids in better maneuvering the vehicle in tighter spaces without risking undesirable part interference—such as, but not limited to the tire coming into contact with the wheel well due to vehicle jounce. If, however, the resulting relative movement values for each monitored location (over an elapsed, period of time) may indicate that undesirable part interference may occur (such as but not limited to wheels being at risk for contacting the wheel well (not shown)), then the travel limit of the steering assist unit 18 may not be increased (or a return force may be applied) to prevent damage to the vehicle subsystems or components. Therefore, the control unit 42 may adapt the travel limits of the steering assist unit 18 based on the example looped, time elapsed method of comparing and calculating data from at least the first, second and third accelerometers.

As indicated, in one non-limiting example, the locations for the first, second and third accelerometers 32, 34, 36 may consist of the two front wheels 28, 30 and the drive tunnel or floor pan of the vehicle body 40. In yet another example, the three locations for the first, second and third accelerometers 32, 34, 36 may consist of the steering control unit 42, the first front wheel 28 and the second front wheel 30 respectively as another non-limiting example. This control system which adjusts the travel limit of the steering assist unit based on the vector G-forces on various vehicle components provides for better maneuverability of the vehicle 10, thereby increasing customer satisfaction. Generally, the acceptable travel limits depend on the proximity of various neighboring components in the vehicle (such as, but not limited to the tire and the wheel well). For example, the acceptable travel limits for the steering system 12 can range from about 86 millimeters (mm) and may be extended to about 92 mm depending on the loads imposed on various vehicle components. In this non-limiting example, if the relative movement value indicates that there is a risk of interference between vehicle components, then the travel limit for the steering system 12 can be reduced from about 92 mm to about 86 mm via, for example, a signal from the control unit 42 to the steering assist unit 18 where a return force is applied by the steering system.

Figure 3:
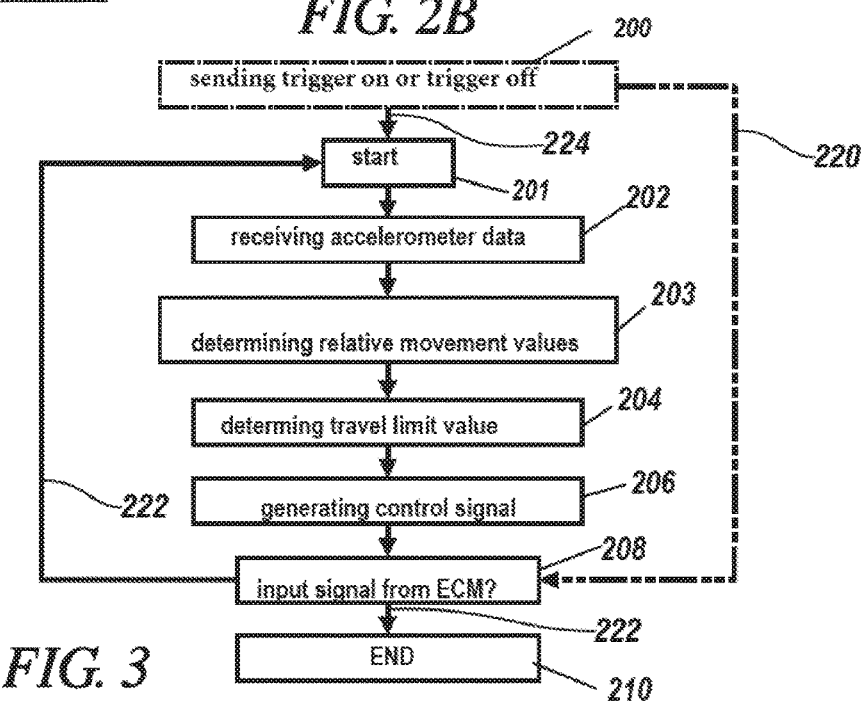
FIG. 3 is a flowchart illustrating a control method of the steering system in accordance with various embodiments.

Referring now to FIG. 3, and with continued reference to FIGS. 1A-B and 2A-B, a flowchart illustrates a control method that can be performed by the control unit 42 of FIGS. 1A-1B in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method of FIG. 3 may, but not necessarily, operate under a looped, time-elapsed manner to provide continuous, repeated feedback to the control module to determine if a tire is likely to come into contact with a wheel wells of the vehicle. It is further understood that this method may, but not necessarily, only be triggered by a signal from the engine control unit (not shown) when the vehicle is operating at a speed below 15 mph.

With reference to FIG. 3, a non-limiting example of the method is shown where the method can begin at 201. As an optional step 200 the engine control module for the vehicle may send a signal to the steering control unit 42 to "turn on" or trigger 224 the looped method of the present disclosure, and it may be optional for the engine control module to send a signal to the steering control unit 42 to "turn of" or "trigger off" 220 the looped method of the present disclosure. Accordingly, in the event that the looped method of the present disclosure is triggered, the method receives 202 input data from at least first, second and third accelerometers. It is understood that the number of accelerometers taking data in step 202 may vary and is not limited to three accelerometers. At 203, the input data 106 (shown in FIGS. 2A and 2B) from the first, second and third accelerometers is compared and calculated to determine a relative movement value for each monitored location. The relative movement value may, but not necessarily be the difference between the accelerometer readings as described above (shown in FIGS. 2A and 2B). At 204, the travel limit value 112 for the steering rack may then be determined from the tables of the travel datastore 104 based on the relative movement values 105 for each monitored location. If the relative movement values 105 fall within an acceptable range; the travel limit value is increased to allow for better maneuverability and at 206, the control unit 42 generates a steering assist control signal to the steering assist unit 18 to increase the travel limit. However, if the relative movement values (shown as 105 in FIGS. 2A and 2B) are outside of an acceptable range, the associated travel limit value is set to a standard or default limit to prevent the steering rack to travel over an extended length such that the control unit 42 generates a control signal to the steering assist unit to maintain the steering travel length to the default position. Accordingly, at 206, the steering assist control signal 110 is then generated based on the selected travel limit value 112 so that the travel limit of the steering wheel may be adjusted as described earlier—wherein a return force is applied or steering travel may or may not be extended. At 208, the control unit 42 will determine whether a signal has been received from the engine control module. At 222, if no signal is received from the engine control module, then the method proceeds in a looped manner back to step 201. However, if an interrupt or turn off signal is received (at 226) from the engine control module, then the method proceeds to end at 210. Therefore, the method 99 of the present disclosure may optionally continue to operate in a looped condition until the engine control unit sends a "trigger-off" signal to control unit 42.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a steering assist unit of a vehicle, the method comprising:
    transmitting first accelerometer data from a first location to a steering travel control module in a control unit and transmitting second accelerometer data from a second location to the steering travel control module, and transmitting third accelerometer data from a third location to the steering travel control module;
    calculating the first accelerometer data against each of the second and third accelerometer data to determine a second location relative movement value for the second location and a third location relative movement value for the third location;
    determining whether the second location relative movement value and the third location relative movement value falls outside of an acceptable value range via the steering travel control module;
    transmitting the second location relative movement value and the third location relative movement value from the steering travel control module to a travel datastore;
    determining a travel limit value at the travel datastore based on the relative movement value from each of the second and the third location;
    transmitting the travel limit value from the travel datastore to the steering travel control module; and
    controlling a travel of the steering assist unit based on the transmitted travel limit value, by the control unit, to perform one of:

limiting the travel of the steering assist unit when the second and third location relative movement values fall outside the acceptable value range and a steering rack is in a regular travel mode;

unsteering the travel of the steering assist unit when the second and third location relative movement values fall outside the acceptable value range and the steering rack is in an extended travel mode; and extending the travel of the steering assist unit when the second and third location relative movement values fall within the acceptable value range, wherein the first location is a portion of a vehicle body, the second location is one of a first front wheel, a first front suspension, or a first front knuckle, and the third location is on one of a second front wheel, a second front suspension, or a second front knuckle, wherein the second location relative movement value is a difference in acceleration between the second location and the portion of the vehicle body, wherein the second relative movement value identifies a speed and direction at which the portion of vehicle body moves relative to the second location, wherein the third location relative movement value is another difference in acceleration between the third location and the portion of the vehicle body, and wherein the third relative movement value identifies another speed and direction at which the portion of the vehicle body moves relative to the third location.

2. The method of claim 1 wherein the second location relative movement value and the third location movement value identify a jounce condition in the vehicle respectively resulting from the relative movement of portion of the body and the second location, and the relative movement of portion of the body and the third location.

3. The method of claim 1 wherein the second location relative movement value and the third location movement value identify a rebound condition in the vehicle respectively resulting from the relative movement of portion of the body and the second location, and the relative movement of portion of the body and the third location.

4. The method of claim 1 wherein the steering assist unit receives a trigger-on or a trigger-off signal from the control unit.

5. A method of controlling a steering assist unit of a vehicle, the method comprising:

transmitting first accelerometer data from a first location to a steering travel control module in a control unit, transmitting second accelerometer data from a second location to the steering travel control module, transmitting third accelerometer data from a third location to the steering travel control module, transmitting fourth accelerometer data from a fourth location to the steering travel control module, and transmitting fifth accelerometer data from a fifth location to the steering travel control module;

calculating the first accelerometer data against each of the second, third, fourth and fifth accelerometer data via the steering control module to determine a second location relative movement value, a third location relative movement value, fourth location relative movement value, and a fifth location relative movement value;

determining whether the second, third, fourth and fifth location relative movement values fall outside of an acceptable value range via the steering travel control module;

transmitting the second, third, fourth and fifth location relative movement values from the steering travel control module to a travel datastore;

selecting a pre-determined travel limit value at the travel datastore based on the second, third, fourth and fifth relative movement values;

transmitting the pre-determined travel limit value from the travel datastore to the steering travel control module; and controlling a travel of the steering assist unit based on the transmitted pre-determined travel limit value, by the control unit, to perform one of:

limiting the travel of the steering assist unit when the second, third, fourth and fifth location relative movement values falls outside the acceptable value range and a steering rack is in regular travel mode, unsteering the travel of the steering assist unit when the second, third, fourth and fifth location relative movement values fall outside the acceptable value range and the steering rack is in regular travel mode, and extending the travel of the steering assist unit when the second, third, fourth and fifth location relative movement values fall within the acceptable value range, wherein the first location is a portion of a vehicle body, the second location is one of a first front wheel, a first front suspension, or a first front knuckle, and the third location is on one of a second front wheel, a second front suspension, or a second front knuckle, wherein the second location relative movement value is a difference in acceleration between the second location and the portion of the vehicle body, wherein the second relative movement value identifies a speed and direction at which the portion of vehicle body moves relative to the second location, wherein the third location relative movement value is another difference in acceleration between the third location and the portion of the vehicle body, and wherein the third relative movement value identifies another speed and direction at which the portion of the vehicle body moves relative to the third location.

6. The method of claim 5 wherein the fourth location is one of a third rear wheel, a third rear suspension, or a third rear knuckle, and the fifth location is one of a fourth rear wheel, a fourth rear suspension, or a fourth rear knuckle.

* * * * *